Patented June 7, 1938

2,119,722

UNITED STATES PATENT OFFICE 2,119,722

CELLULOSE ACETATE-PROPIONATE COMPOSITION CONTAINING A LOWER ALKYL RICINOLEATE

Henry B. Smith, Rochester, N. Y., assignor, by mesne assignments, to Eastman Kodak Company, Jersey City, N. J., a corporation of New Jersey No Drawing. Application December 26, 1935, Serial No. 56,236

4 Claims. (Cl. 106—40)

This invention relates to plasticizers for mixed organic acid esters of cellulose, such, for instance, as cellulose acetate-propionate and cellulose acetate-stearate. One object of the invention is to provide cellulose mixed ester compositions from which flexible sheets and other useful plastic products may be made. Another object is to provide flexible sheets of cellulose mixed esters, such as are useful for photographic film, wrapping sheets, etc. Other objects will hereinafter appear.

Cellulose acetate-propionate has become known only within the last few years, and the field of plasticizers for it and for other mixed esters of cellulose is, as yet, not well explored, although certain plasticizers for these esters have recently been discovered, such, for instance, as tri-o-diphenyl phosphate, diamyl hydroquinone, mono-butyl glyceryl oleate, ethoxyethyl laurate, diacetyl glyceryl stearate, ethoxyethyl stearate, ethylene glycol dilaurate and chlorinated paraffin oil.

Fully esterified cellulose acetate-propionate, cellulose acetate-butyrate, etc., may be prepared as described in Clarke & Malm's U. S. Patent No. 1,800,860. The preparation of partially hydrolyzed cellulose acetate-propionate and other mixed esters, i. e., cellulose acetate-propionate, etc. from which a portion of the acyl groups has been hydrolyzed off, is described in the copending application of Carl J. Malm and Charles E. Fletcher Serial No. 551,546, Patent No. 2,026,583. Cellulose acetate-stearate may be prepared as described in Clarke & Malm's U. S. Patent No. 1,987,053.

Cellulose acetate-propionate and similar mixed organic acid esters of cellulose have properties differing from those of cellulose acetate. For instance, propylene chloride and ethylene chloride, which alone are not solvents for cellulose acetate—either fully esterified or partially hydrolyzed—readily dissolve a majority of these cellulose esters, whether fully esterified or partially hydrolyzed, and sheets coated from such solutions, even without a plasticizer, show fair flexibility, as is disclosed in Carl J. Malm's U. S. Patent No. 2,006,362. Furthermore, acetone is a solvent for unhydrolyzed or fully esterified cellulose acetate-propionate, although sheets coated from such solutions are brittle, whereas unhydrolyzed cellulose acetate is not soluble in acetone.

Consistently with the unexpected behavoir of the cellulose mixed esters, I have now found that certain compounds which are not compatible with commercial forms of cellulose acetate are excellent plasticizers for cellulose acetate-propionate, etc. The lower alkyl esters of ricinoleic acid, while compatible with cellulose nitrate, are incompatible with the only commercially-used form of cellulose acetate, namely, acetone-soluble cellulose acetate, and consequently, nowhere in the art have they ever been suggested as components of cellulose acetate compositions. Fully esterified cellulose acetate, even when combined with plasticizers, is not commercially valuable. Contrary to expectation, I have discovered that the lower alkyl esters of ricinoleic acid, such as methyl, ethyl and butyl ricinoleates, are compatible with, and excellent plasticizers for, a certain range of acetone-soluble cellulose acetate-propionate, and with other similar mixed organic acid esters of cellulose, such, for example, as cellulose acetate-stearate. The cellulose acetate-propionates with which the lower alkyl ricinoleates are compatible are the fully esterified cellulose acetate-propionates and those so slightly hydrolyzed that they contain less than 1 esterifiable hydroxyl group per 24 carbon atoms of the cellulose radical.

The ratio of acetyl radical to propionyl radical in the cellulose acetate-propionate may be varied within wide limits, the compatibility of my novel plasticizers being dependent on the complete or nearly complete esterification of the cellulose in the cellulose mixed ester rather than on any particular ratio of propionyl radical to acetyl radical. When a cellulose acetate-propionate is hydrolyzed to such an extent as to contain more than 1 esterifiable hydroxyl group per 24 carbon atoms of the cellulose radical, incompatibility of the lower alkyl ricinoleates results.

In order that those skilled in the art may better understand my invention I would state, by way of illustration, that for the manufacture of photographic film base or other sheets my new compositions of matter may be compounded as follows: 100 parts by weight of cellulose acetate-propionate containing 0.4 esterifiable hydroxyl per 24 carbon atoms of the cellulose radical is dissolved with stirring in from 500 to 600 parts by weight of ethylene chloride, or of a mixture of 85% propylene chloride and 15% methanol. To this solution may be added from 10 to 50 parts by weight of methyl, ethyl or butyl ricinoleate. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency and low inflammability, burning no more readily than ordinary newsprint. Films or sheets produced in accordance with my invention are tough and extremely flexible. For instance, films of fully esterified cellulose acetate-propionate plasticized with from 10% to 50% of methyl ricinoleate (parts by weight based on the weight of the cellulose ester), had an initial flexibility of from 250% to 1100% of that of a film of the same cellulose ester with no plasticizer, and films of fully esterified cellulose acetate-propionate plasticized with from 10% to 50% of ethyl ricinoleate or of butyl ricinoleate had an initial flexibility of from 180% to 700% of that of a film of the same cellulose ester with no plasticizer.

Furthermore, films plasticized with my novel plasticizers maintain flexibility in a superior fashion. For instance, a film of fully esterified cellulose acetate-propionate containing 10% of methyl ricinoleate (10 parts by weight of methyl ricinoleate per 100 parts of cellulose ester) retained flexibility at 65° C. for 177 days; films of fully esterified cellulose acetate-propionate containing from 10% to 20% of ethyl ricinoleate retained flexibility at 65° C. for 233 days, and films of fully esterified cellulose acetate-propionate containing 10%, 20%, and 30% of butyl ricinoleate retained flexibility at 65° C. for 198 days, 212 days, and 219 days, respectively, whereas an unplasticized film of the same cellulose ester had become brittle at the end of 72 days. This indicates that films so plasticized will withstand ordinary usage satisfactorily for many years.

Other solvents which are compatible with the cellulose ester being used, and with the plasticizer, may be employed instead of those mentioned above. The lower alkyl ricinoleates are also compatible with certain other mixed organic acid esters of cellulose, such, for instance, as cellulose acetate-stearate, and, in smaller amounts, with cellulose acetate-butyrate.

While I have described the manufacture of films and sheets from my new compositions, it will be apparent that they may be employed with advantage in the other branches of the plastic art, such, for instance, as in the manufacture of lacquers.

What I claim as my invention and desire to be secured by Letters Patent of the United States is:

1. A transparent, flexible sheet comprising 100 parts by weight of cellulose acetate-propionate containing less than 1 esterifiable hydroxyl group per 24 carbon atoms of the cellulose radical, and from 10 to 50 parts, by weight, of a lower alkyl ricinoleate as a plasticizer therefor.

2. A transparent, flexible sheet comprising 100 parts by weight of cellulose acetate-propionate containing less than 1 esterifiable hydroxyl group per 24 carbon atoms of the cellulose radical, and from 10 to 50 parts, by weight, of methyl ricinoleate as a plasticizer therefor.

3. A transparent, flexible sheet comprising 100 parts by weight of cellulose acetate-propionate containing less than 1 esterifiable hydroxyl group per 24 carbon atoms of the cellulose radical, and from 10 to 50 parts, by weight, of ethyl ricinoleate as a plasticizer therefor.

4. A transparent, flexible sheet comprising 100 parts by weight of cellulose acetate-propionate containing less than 1 esterifiable hydroxyl group per 24 carbon atoms of the cellulose radical, and from 10 to 50 parts, by weight, of butyl ricinoleate as a plasticizer therefor.

HENRY B. SMITH.